(12) United States Patent
Kajiwara et al.

(10) Patent No.: US 10,384,176 B2
(45) Date of Patent: Aug. 20, 2019

(54) STIRRING DEVICE

(71) Applicant: KAJIWARA INC., Tokyo (JP)

(72) Inventors: Hidehiro Kajiwara, Tokyo (JP); Norikazu Ishii, Tokyo (JP); Masatoshi Suzuki, Tokyo (JP)

(73) Assignee: Kajiwara Inc., Tokyo (JP)

( * ) Notice: Subject to any disclaimer, the term of this patent is extended or adjusted under 35 U.S.C. 154(b) by 895 days.

(21) Appl. No.: 14/654,863

(22) PCT Filed: May 29, 2013

(86) PCT No.: PCT/JP2013/003405
§ 371 (c)(1),
(2) Date: Jun. 23, 2015

(87) PCT Pub. No.: WO2014/103089
PCT Pub. Date: Jul. 3, 2014

(65) Prior Publication Data
US 2015/0336062 A1 Nov. 26, 2015

(30) Foreign Application Priority Data

Dec. 25, 2012 (JP) .................................. 2012-281562

(51) Int. Cl.
*A23L 5/10* (2016.01)
*B01F 7/00* (2006.01)
(Continued)

(52) U.S. Cl.
CPC .............. *B01F 7/0035* (2013.01); *A23L 5/10* (2016.08); *A23L 27/60* (2016.08); *A47J 27/004* (2013.01);
(Continued)

(58) Field of Classification Search
CPC ...... A47J 43/046; A47J 43/0772; A47J 43/08; A47J 43/085; A47J 43/165; A47J 43/04;
(Continued)

(56) References Cited

U.S. PATENT DOCUMENTS

2015/0336062 A1  11/2015  Kajiwara et al.

FOREIGN PATENT DOCUMENTS

JP        58-137092      9/1983
JP        1-231928       9/1989
(Continued)

OTHER PUBLICATIONS

English translation of Japanese patent document JP 2007-160186A.*
English translation of Japanese patent document JPH 0856590A.*

*Primary Examiner* — Shelley M Self
*Assistant Examiner* — Joseph Finan
(74) *Attorney, Agent, or Firm* — Norris McLaughlin, P.A.

(57) ABSTRACT

Provided is a stirring device that allows a weight measurement during a rotation operation to be accurately performed while suppressing increase in reinforcement structures required for support of a stirring container and suppressing increase in weight. A device frame is provided with legs, a heating kettle is provided with a reinforcement base attached on the bottom side, a motor bed is provided to support a cutter/motor unit to the reinforcement base or the device frame, load cells are provided to indirectly measure a change in weight of a stirring substance in the heating kettle during a rotation operation of the cutter/motor unit, and closed reinforced structures are configured to include the heating kettle, the cutter/motor unit, the reinforcement base, and the supporting stand as reinforcing members.

7 Claims, 4 Drawing Sheets

(51) Int. Cl.
  *B01F 7/02*    (2006.01)
  *B01F 7/16*    (2006.01)
  *A23L 27/60*   (2016.01)
  *A47J 27/00*   (2006.01)
  *A47J 36/16*   (2006.01)
  *A47J 43/04*   (2006.01)
  *B01F 13/10*   (2006.01)
  *B01F 15/00*   (2006.01)
  *B01F 15/06*   (2006.01)

(52) U.S. Cl.
  CPC ............. *A47J 36/165* (2013.01); *A47J 43/04* (2013.01); *B01F 7/00166* (2013.01); *B01F 7/00208* (2013.01); *B01F 7/021* (2013.01); *B01F 7/161* (2013.01); *B01F 13/105* (2013.01); *B01F 15/00194* (2013.01); *B01F 15/00538* (2013.01); *B01F 15/00831* (2013.01); *B01F 15/06* (2013.01); *B01F 15/065* (2013.01); *B01F 2013/108* (2013.01); *B01F 2015/062* (2013.01)

(58) Field of Classification Search
  CPC ...... B01F 7/00008; B01F 7/00; B01F 7/0035; B01F 7/021; B01F 7/00166; B01F 7/00208; B01F 7/161; B01F 13/105; B01F 15/00194; B01F 15/00538; B01F 15/00831; B01F 15/06; B01F 15/065; B01F 2015/062; A01F 15/06; A01F 15/00538; A01F 15/00831; A01F 15/00194; A01F 15/00208; A23L 27/60; A23L 5/10
  USPC ................... 241/166, 101.8, 65, 277, 46.17
  See application file for complete search history.

(56) References Cited

FOREIGN PATENT DOCUMENTS

| JP | 2-45133 U |   | 3/1990 |
|----|-----------|---|--------|
| JP | 6-84886   |   | 12/1994 |
| JP | 8-56590   |   | 3/1996 |
| JP | 0856590 A | * | 3/1996 |
| JP | 8-322743  |   | 12/1996 |
| JP | 9-136026  |   | 5/1997 |
| JP | 2000-73397 |  | 3/2000 |
| JP | 2000-236833 | | 9/2000 |
| JP | 2001-231680 | | 8/2001 |
| JP | 2003-160197 | | 6/2003 |
| JP | 2007-160186 | | 6/2007 |
| JP | 2007160186 A | * | 6/2007 |
| JP | 2011-092845 A | | 5/2011 |
| JP | 201192845 A | * | 12/2011 |
| JP | 2014-124554 A | | 7/2014 |

* cited by examiner

[FIG.1]
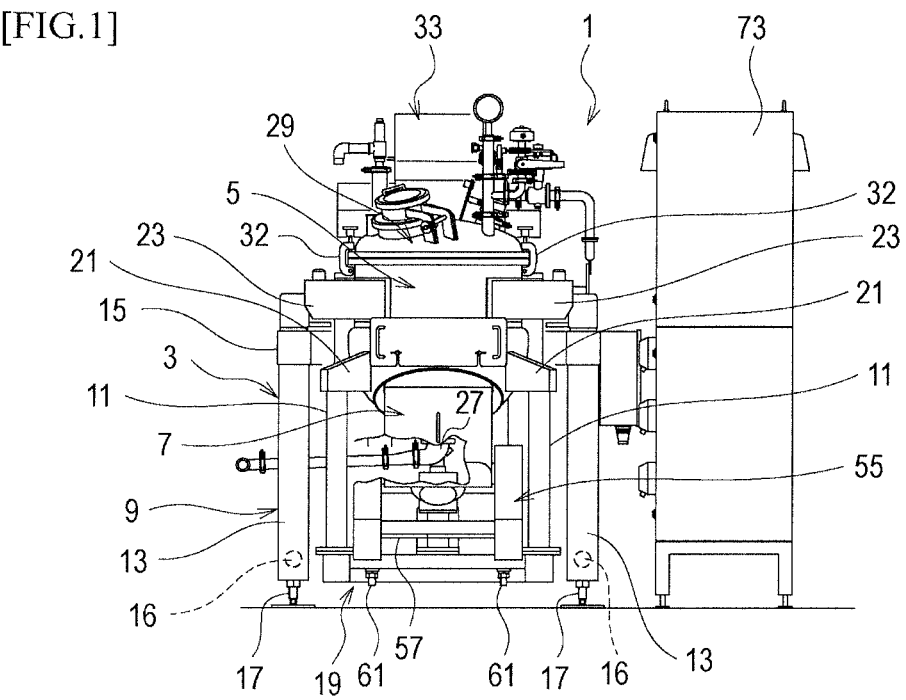
[FIG.2]
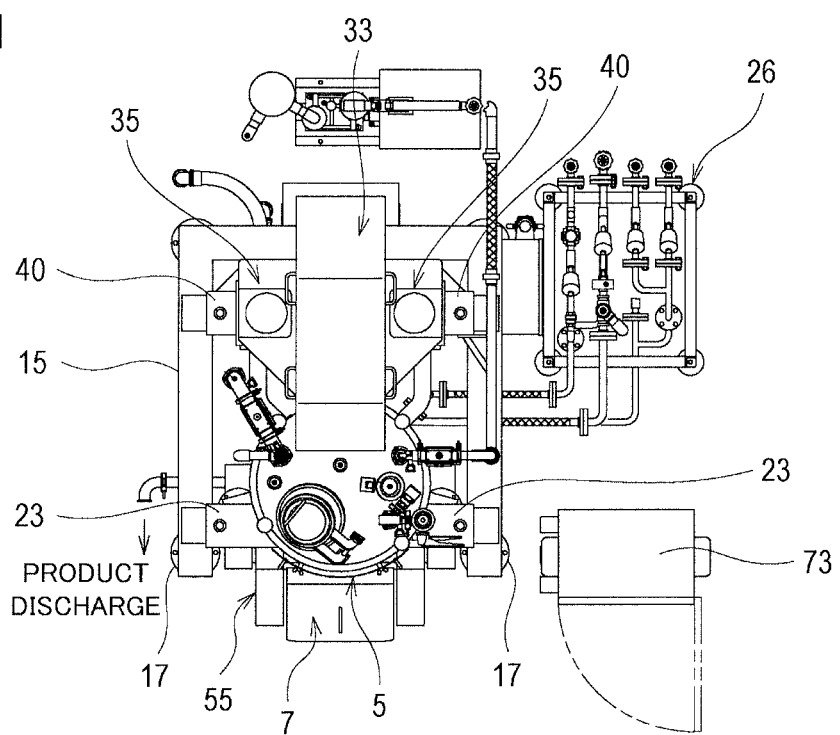

[FIG.3]
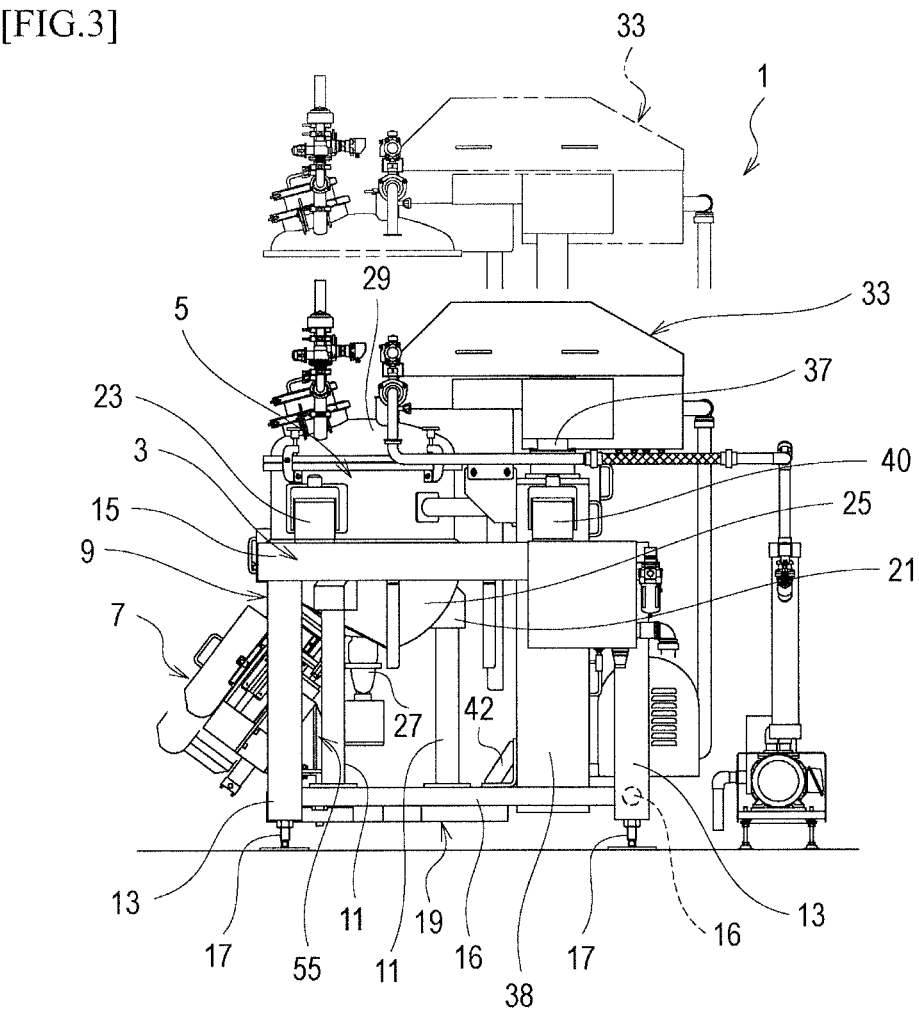
[FIG.4]
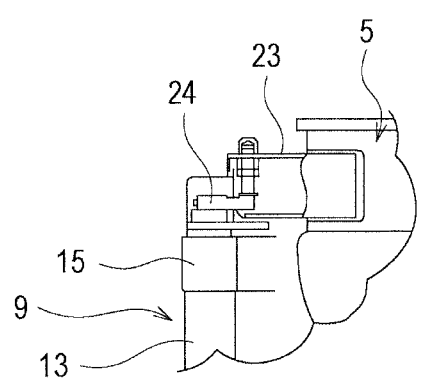

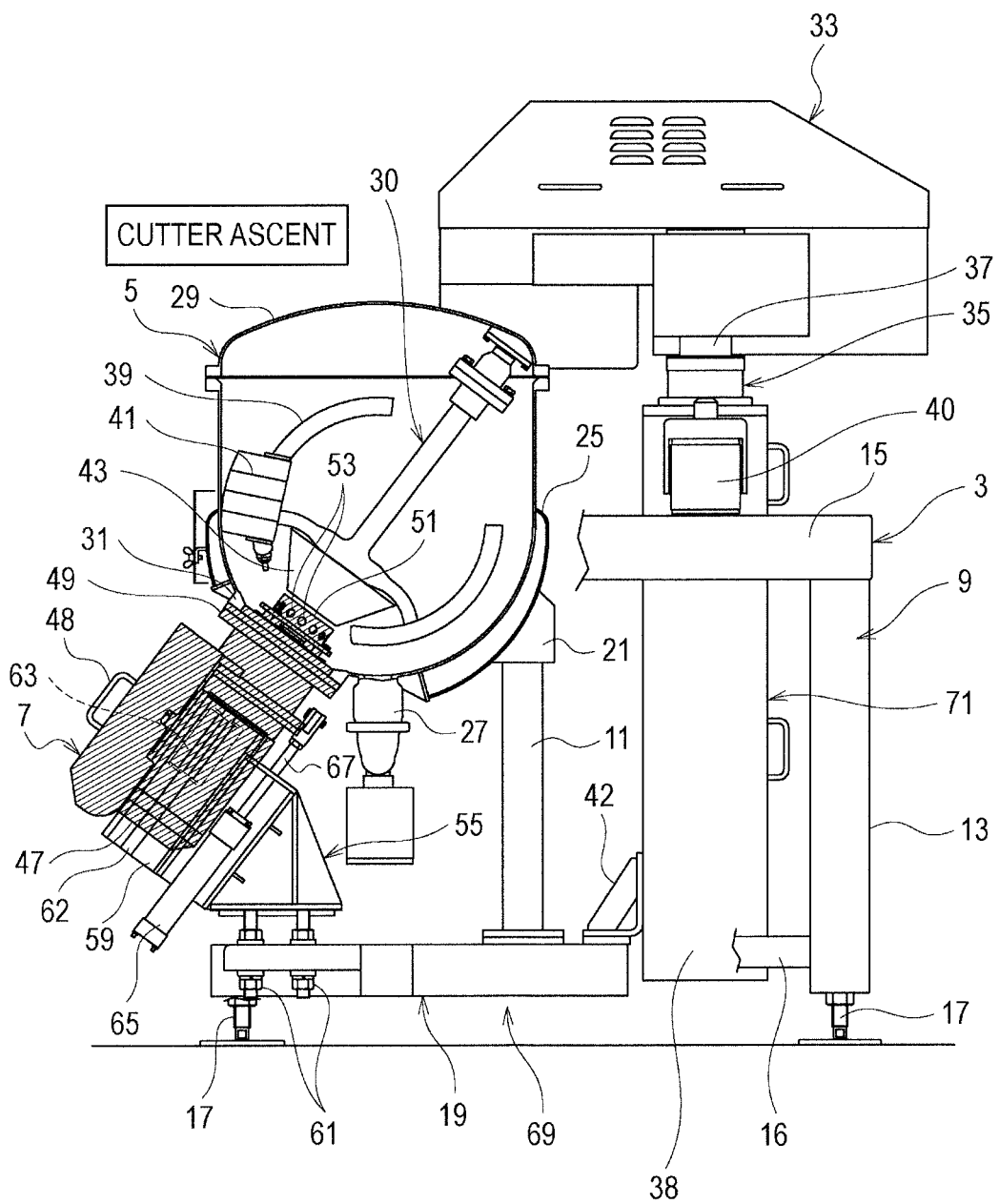
[FIG.5]

[FIG.6]
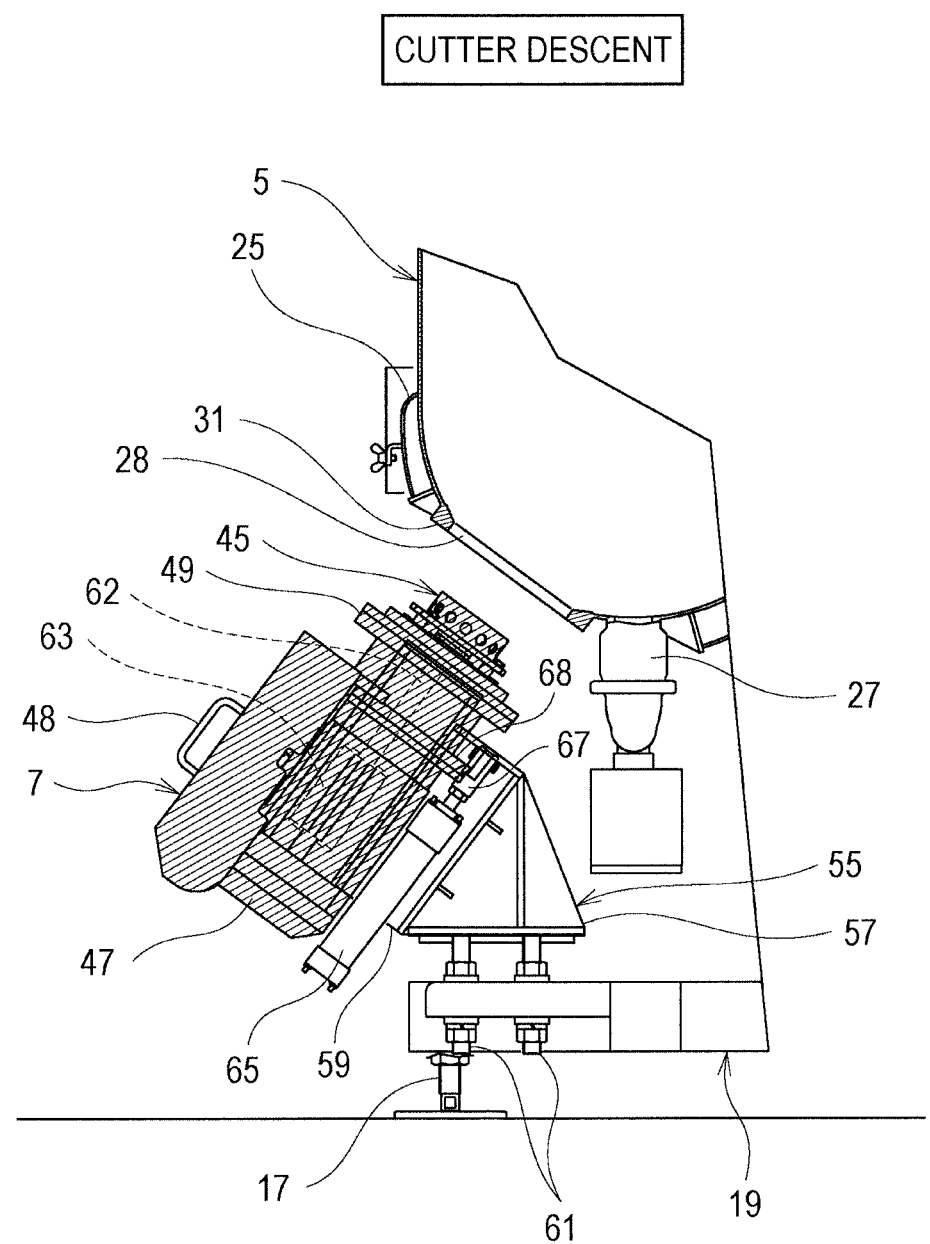

STIRRING DEVICE

FIELD OF THE INVENTION

The present invention relates to a stirring device available for producing food such as mayonnaise and dressing, cosmetics, drugs, and chemicals etc. to be emulsified.

BACKGROUND OF THE INVENTION

As this type of a conventional stirring device, for example, there is one disclosed in Patent document 1.

This stirring device is provided with a cutter/motor unit attached to one side of a bottom part of a heating kettle as a stirring container. The cutter/motor, in which a cutter part and a motor part are coaxially and integrally formed and are linked with each other, is attached to the bottom part of the heating kettle. The cutter part faces inside the heating kettle.

Into the heating kettle, supporting rods attached to a stirring shaft is inserted from the top. To the supporting rods, a plurality of scraping blades are attached.

Therefore, with the cutter/motor unit, a stirring substance such as ingredient is further efficiently stirred and finely-crushed while forming a circulating flow intersecting a stirring flow that is caused by rotation of the stirring shaft in the heating kettle in combination with a high stirring and crushing effect of the cutter part.

In a case where such stirring and crushing are carried out in conjunction with heating, measuring a change in weight of a stirring substance allows heating and stirring to be accurately performed to obtain an on-target stirred substance. Further, measuring the change in weight allows work to be accurately performed not only when performing the heating and stirring but also when blending an additive or the like into a stirring substance during a stirring operation while measuring and adjusting quantity.

As such a measurement of a change in weight, there is one disclosed in Patent document 2. This Patent document 2 is based on that entire weight of a device is measured by load cells attached to legs during heating and stirring. The entire weight that successively changes during the heating and stirring is gained to be converted into weight of the stirring substance, thereby to terminate the heating and stirring at an appropriate amount of moisture etc.

In such a device, however, vibration during the stirring affects the weight measurement and therefore a supporting structure of a heating kettle needs to be strengthened. This results in a problem to raise required reinforcement structures and lead to an increase in weight.

PATENT DOCUMENT 1: JP2007-160186A
PATENT DOCUMENT 2: JP08-56590A

SUMMARY OF THE INVENTION

A problem to be solved is that vibration during stirring affects a weight measurement and therefore a supporting structure of a heating device needs to be strengthened, thereby increasing required reinforcement structures and leading to an increase in weight.

The present invention provides a stirring device capable of accurately performing a weight measurement during a rotation operation while suppressing increase in reinforcement structures required for support of a stirring container and suppressing increase in weight. The stirring device comprises a stirring container supported with a device frame, and a rotary operating part/motor unit, in which a rotary operating part and a motor part are coaxially and integrally formed and linked with each other, attached to a bottom part of the stirring container at a slant so that a rotational axis is inclined downward toward an outside of the stirring container, the motor part side protruding outside the stirring container and the rotary operating part facing inside the stirring container. The device frame is provided with legs, the stirring container is provided with a reinforcement base attached on the bottom side, a supporting stand is provided to support the rotary operating part/motor unit to the reinforcement base or the device frame, a weight-measuring instrument is provided to indirectly measure a change in weight of a stirring substance in the stirring container during a rotation operation of the rotary operating part/motor unit, and a closed reinforced structure is configured to include the stirring container, the rotary operating part/motor unit, the reinforcement base, and the supporting stand as reinforcing members.

The stirring device according to the present invention, due to the aforementioned configuration, uses the stirring container and the rotary operating part/motor unit themselves as the reinforcing members, thereby strengthening a supporting structure of the stirring container while reducing reinforcement structures required for support of the stirring container and suppressing increase in weight.

Accordingly, it prevents vibration during stirring from affecting a weight measurement and allows the weight measurement to be accurately performed.

BRIEF DESCRIPTION OF THE DRAWINGS

FIG. 1 is a front view of a heating-and-stirring cooking device according to Embodiment 1;

FIG. 2 is a plan view of the heating-and-stirring cooking device according to Embodiment 1;

FIG. 3 is a side view of the heating-and-stirring cooking device according to Embodiment 1;

FIG. 4 is an enlarged sectional view partly illustrating fitting of a load cell according to Embodiment 1;

FIG. 5 is an enlarged side view partly illustrating a supporting structure of a heating kettle and a cutter/motor unit according to Embodiment 1; and FIG. 6 is an enlarged side view partly illustrating the cutter/motor unit at the time of a descent according to Embodiment 1.

EMBODIMENT FOR CARRYING OUT THE INVENTION

The object capable of accurately performing a weight measurement during a rotation operation while suppressing increase in reinforcement structures required for support of a stirring container and suppressing increase in weight is accomplished by that a device frame 3 is provided with legs 17, a heating kettle 5 is provided with a reinforcement base 19 attached on the bottom side, a motor bed 55 is provided to support a cutter/motor unit 7 to the reinforcement base 19 or the device frame 3, load cells 24 are provided capable of indirectly measuring a change in weight of a stirring substance in the heating kettle 5 during a rotation operation of the cutter/motor unit 7, and closed reinforced structures 69, 71 are configured to include the heating kettle 5, the cutter/motor unit 7, the reinforcement base, and the supporting stand as reinforcing members.

FIG. 1 is a front view of a heating-and-stirring cooking device, FIG. 2 is a plan view of the heating-and-stirring cooking device, FIG. 3 is a side view of the heating-and-stirring cooking device, FIG. 4 is an enlarged sectional view partly illustrating fitting of the load cell, FIG. 5 is an enlarged side view partly illustrating a supporting structure of the heating kettle and the cutter/motor unit, and FIG. 6 is an enlarged side view partly illustrating the cutter/motor unit at the time of a descent. In the following explanation, the right and left in the plan view of FIG. 2 are the right and left of the device, the bottom is the front, and the top is the rear.

As illustrated in FIGS. 1 to 6, a stirring device is configured as the heating-and-stirring cooking device 1 according to the embodiment. In addition, the stirring device may be applied to a stirring cooking device without heating, a stirring device with or without heating available for producing food such as mayonnaise and dressing, cosmetics, drugs, and chemicals etc. to be emulsified.

The heating-and-stirring cooking device 1 is provided with the heating kettle 5 as a stirring container supported with the device frame 3, and the cutter/motor unit 7 as a rotary operating part/motor unit.

The device frame 3 has a body frame 9.

In the body frame 9, upper portions of four posts 13 are connected to an upper frame 15 and lower portions of the four posts 13 are connected to each other with respective rods 16 at the left, the right and the rear. The upper frame 15 is open on the front side to form a channel shape in plan view.

Each one post 13 is provided with the leg 17, and the body frame 9 is installed by equipment of a plurality of the legs 17.

The reinforcement base 19 is arranged at a front bottom part of the body frame 9. The reinforcement base 19 is attached to a bottom part of the heating kettle 5 as a stirring container side through uprising frames 11.

Three uprising frames 11 are provided between the heating kettle 5 and the reinforcement base 19. Upper parts of the uprising frames 11 are connected to the bottom part side of the heating kettle 5 with bottom brackets 21. One of the uprising frames 11 is arranged on the rear side of the heating kettle 5, and the other two are arranged right and left on the front side.

The heating kettle 5 is supported at right and left upper parts on the front side with the upper frame 15 through the kettle side brackets 23. Between each one of these right-and-left kettle side brackets 23 and the upper frame 15, the load cell 24 is interposed as illustrated in FIG. 4.

The heating kettle 5 has a structure in which a cylindrical body part and a hemispherical bottom part are integrally formed. A circumference of an outer surface on the bottom side, for example, a steam jacket 25 is provided in a closed section. The steam jacket 25 is configured to allow steam for heating to be supplied from and discharged to a steam supplying unit 26. It, however, may be configured to heat the bottom part using electricity or gas without the provision of the steam jacket 25. It may be configured as a simple stirring container with the absence of the heating structure.

To the heating kettle 5, a discharging part 27 for a stirring substance is connected at a bottom center and a connection hole 28 is formed to orient toward an obliquely front lower side of the bottom part. To a top of the heating kettle 5, an up-and-down lid 29 is provided, and into the inside, the a stirring shaft 30 is inserted.

The connection hole 28 through which the cutter/motor unit 7 is detachably connected is provided to a connection-receiving seat 31.

The up-and-down lid 29 is to be driven up and down so as to open and close the upper part of the heating kettle 5 and is connected and fixed to a driving box 33 as a driving unit.

A state where the up-and-down lid 29 closes the heating kettle 5 is fixed by a clamp 32.

The driving box 33 is internally provided with an electric motor and a reduction gear set, and the electric motor is connected and linked to the stirring shaft 30 through the reduction gear set. The stirring shaft 30 is capable of being driven by the driving box 33 in a normal rotation direction and a reverse rotation direction.

The driving box 33 is supported with a piston 37 of an up-and-down cylinder unit 35 configuring an up-and-down driving unit based on hydraulics etc. and is movable up and down by extension and contraction of the piston 37. With this up-and-down movement of the driving box 33, the up-and-down lid 29 is moved up and down integrally with the stirring shaft 30. The up-and-down cylinder unit 35 is supported with an up-and-down driving unit frame 38. The up-and-down driving unit frame 38 is supported with the upper frame 15 through right and left brackets 40 on the up-and-down driving unit side. Between each one of the right and left brackets 40 on the up-and-down driving unit side and the upper frame 15, the load cell is interposed by the same structure as FIG. 4.

Accordingly, the heating kettle 5, the driving box 33, the up-and-down cylinder unit 35 and the up-and-down driving unit frame 38, the cutter/motor unit 7, the reinforcement base 19 etc. are bridged and supported with the load cells 24 on the upper frame 15. The load cells 24, therefore, form a weight-measuring instrument capable of indirectly measuring a change in weight of the stirring substance in the heating kettle 5 during the rotation operation of the cutter/motor unit 7.

The support by means of these load cells 24 is near by a gravity center position of the supported heating kettle 5 side in a vertical direction so as to shorten moment arms between the load cells 24 and the gravity center, thereby suppressing input to the load cells 24 according to moments around the gravity center due to vibration force at the time of rotation of the cutter/motor unit 7 etc.

The up-and-down driving unit frame 38 is connected to a rear end of the reinforcement base 19 through a connecting bracket (not shown). The up-and-down driving unit is configured so that an upper part side is supported with the body frame 9 and a lower part side is integrally connected to the reinforcement base 19.

The stirring shaft 30 is provided integrally with arc-shaped supporting rods 39 as stirring operation parts. To the supporting rods 39, a plurality of scraping blades 41 are attached. In the drawings, however, one scraping blade 41 is represented and the others are omitted. At a tip end of the stirring shaft 30, a draft ring 43 that is formed into a tapered cylinder tapering toward the cuter/motor unit 7 is detachably attached.

The stirring shaft 30, therefore, is configured so that the supporting rods 39 and the scraping blades 41 on a lower side are arranged within the heating kettle 5 and an upper part is connected to and is movable up and down integrally with the up-and-down lid 29 side so as to be rotationally driven by the driving box 33 being out of the up-and-down lid 29.

The cutter/motor unit 7 is what a cutter part 45 as a rotary operating part and a motor part 47 are coaxially and integrally formed and linked with each other. This cutter/motor unit 7 is arranged and connected to the connection hole 28 of the heating kettle 5 and is provided with a gripping part 48 at an upper part on the motor part 47 side.

Between the cutter part 45 and the motor part 47, a connection flange 49 is formed to be brought into contact with the connection-receiving seat 31. By bringing the connection flange 49 into contact with the connection-receiving seat 31, the cutter/motor unit 7 is arranged on the front part side of the device frame 3 as one side of the bottom part of the heating kettle 5 and attached at a slant so that a rotational axis is inclined downward toward the forward outside of the device frame 3. The connection flange 49 is fixedly fastened to the connection-receiving seat 31 by bolts. With the attaching, the motor part 47 side protrudes outside the heating kettle 5 and the cutter 45 faces inside the heating kettle 5 so as to closely oppose the draft ring 43 of the stirring shaft 30.

The cutter part 45 is provided with a cylindrical body (not shown) to be rotationally driven, through-holes are formed on the cylindrical body at a constant circumferential interval, and a cutter member is provided to be coaxially arranged within the cylindrical body and be rotatable integrally with the cylindrical body, as described in JP2007-160186A that has been proposed by the applicant of this application.

The cutter part 45, therefore, is to suck the stirring substance inside the heating kettle 5 in the cylindrical body 51 from a central portion side of the heating kettle 5, cut and crush the sucked stirring substance with the cutter member, and subsequently discharge the substance from the through-holes 53 along a bottom inner face of the heating kettle 5 due to centrifugal force by means of the cutter member.

The cutter/motor unit 7 is supported with the motor bed 55 as the supporting stand. In the motor bed 55, a motor bed base 57 and a slanted-slide-supporting part 59 are integrally formed. The motor bed base 57 is fixed to a front end of the reinforcement base 19 by bolts and nuts 61, and a guided body 63 of the cutter/motor unit 7 is slidably fitted to a guide pipe 62 of the slanted-slide-supporting part 59.

Cylinder units 65 based on hydraulics etc. is supported with the slanted-slide-supporting part 59, and a protruding part 68 of the cutter/motor unit 7 is connected to each one piston 67.

The cutter/motor unit 7, therefore, is movably supported to the motor bed 55 by moving the guided body 63 along the guide pipe 62 due to the driving of the cylinder unit 65 so as to be movable from a connected position in which the cutter/motor unit is connected to one side of the bottom part of the heating kettle 5 to a detached position in which the cutter/motor unit is detached from the heating kettle 5 and keeps a downward outward distance away from the body frame 9.

By means of the reinforcement base 19, the uprising frames 11, the heating kettle 5, the cutter/motor unit 7 and the motor bed 55, the reinforced structure 69 is formed in a closed shape in the side view of FIGS. 3 and 5.

The closed shape of the reinforced structure 69 in the side view of FIGS. 3 and 4 is a locked chain structure that comprises three sides in which a slanted side depends on the heating kettle 5, the cutter/motor unit 7 and the motor bed 55, a horizontal side depends on the reinforcement base 19, and a vertical side depends on the uprising frame 11 on the rear side.

Further, the reinforced structure 71 is doubly formed in a closed shape surrounding the reinforced structure 69 of the closed shape by the addition of the reinforcement base 19, the up-and-down driving unit frame 38 of the up-and-down driving unit, the driving box 33, and the up-and-down lid 29.

The closed shape of the reinforced structure 71 in the side view of FIGS. 3 and 5 is a locked chain structure that comprises three sides in which a slanted side depends on the up-and-down lid 29 and the driving box 33 as well as the heating kettle 5, the cutter/motor unit 7, and the motor bed 55, a horizontal side depends on the reinforcement base 19 and the up-and-down driving unit frame 38, and a vertical side depends on the up-and-down driving unit frame 38.

Driving control of the cutter/motor unit 7, the steam supplying unit 26, the driving box 33, the up-and-down cylinder unit 35, and the cylinder unit 65 etc. is carried out by a controller 73.

Heating the heating kettle 5 in which food ingredient etc. is dropped is carried out by supplying steam into the steam jacket 25 from the steam supplying unit 26 and discharging the steam.

In this heating state of the heating kettle 5, the driving box 33 rotationally drives the stirring shaft 30 and the supporting rods 39 turn around the supporting shaft 30 to form a stirring flow around the supporting shaft 30 and stir the stirring substance within the heating kettle 5.

The motor part 47 of the cutter/motor unit 7 is driven to rotate the cutter member inside the cylindrical body 51, to cut and crush the stirring substance and spew out the cut stirring substance from the through-holes 53 along the bottom inner face of the heating kettle 5. This causes a circulating flow intersecting the stirring flow and generates strong stirring and crushing force and sucking force.

At the time of such heating and stirring that involve cutting and crushing, the weight on the heating kettle 5 side is measured by the load cells 24 to be input into the controller 73.

The controller 73 calculates the weight of the stirring substance within the heating kettle 5 from the weight on the heating kettle 5 side, to detect or check a finishing condition of the heating and stirring involving the cutting and crushing according to change in weight.

At the time of the measurement by means of the load cells 24, the cutter/motor unit 7 rotates at high speed together with the rotation of the stirring shaft 30. The vibration, therefore, is transmitted to the body frame 9 side.

Now, the cutter/motor unit 7 is attached at a slant so that the rotational axis is inclined downward toward the forward outside of the device frame 3. It is advantageous to wash the cutter part 45 etc. as described later.

On the contrary, the cutter/motor unit 7 that rotates at high speed and is attached at a slant is likely to cause increase in vibration of the entire device.

In this regard, since the present embodiment strengthens the supporting structure of the heating kettle 5 due to the reinforced structures 69 and 71, it prevents the vibration from becoming an obstacle to the measurement by means of the load cells 24 and permits the accurate measurement during the heating, crushing, and stirring.

Further, since the reinforced structures 69 and 71 use the heating kettle 5 and the cutter/motor unit 7 themselves as reinforcing members, reinforcement structures are reduced required for support of the heating kettle 5 and the supporting structure of the heating kettle 5 is strengthened while suppressing increase in weight.

Operation for cleaning, sterilization or the like is carried out after producing the stirred substance by means of the heating and stirring. It is generally-called as CIP and is performed by a method that circulates cleaning liquid within the heating kettle 5.

In this case, the washing of the cutter part 45 is likely to be insufficient due to the structure. Namely, the cutter part 45 is structurally complicated. In particular, it is hard to perform work for completely removing stickum or solids adhering to the cutter 45 with water flow in the case employing the cylindrical body 51 having the through-holes 53 and the cutter member that rotates within the cylindrical body 51 to produce food with low fluidity such as mayonnaise or to crush a solid and produce juice or the like.

Accordingly, it is vital to make a check for a washing state of the cutter part 45 and re-washing after the check be easily performed.

In order to easily check the washing state of the cutter part 45, the up-and-down lid 29 is moved upward by the up-and-down cylinder unit 35 after the washing. From the top of the heating kettle 5 that is opened by this upward movement of the up-and-down lid 29, the washing state of the cutter part 45 at the inside bottom part can be checked.

Even after the washing, if the washing of the cutter part 45 is insufficient, the bolts fastening the connection flange 49 to the connection-receiving seat 31 are removed to make the connection flange 49 be detachable from the connection-receiving seat 31.

In this state, the cylinder unit 65 is driven and contracted to move the cutter/motor unit 7 obliquely downward as illustrated in FIG. 5. This downward movement is performed relative to the motor bed 55 by moving the guided body 63 along the guide pipe 62 due to the driving of the cylinder unit 65.

The cutter/motor unit 7, therefore, moves in the front area outside the body frame 9 to the detached position in which the cutter/motor unit keeps downward outward distance away from the posts 13 at the front end. With this movement, the cutter part 45 exposes between the posts 13 at the front end.

A cover is appropriately attached to avoid the motor part 47 being splashed with water, and the cutter part 45 can be easily re-washed by a direct hand-wash. Evaluation of a finished result after the re-washing is visually carried out. If it is determined that the washing is insufficient or there is a need to be mechanically maintained, a disassembly maintenance is implemented. Replacement work of the cutter is carried out if needed.

In this case, the cutter part 45 is positioned between the front-end posts 13 at a downward-moved position with the aforementioned downward movement so as to form a condition in which the cutter part is positionally easy to be washed as well as the exposure of the cutter part 45. This allows the cutter part 45 to be extremely easily washed.

Further, the downward-moved cutter/motor unit 7 allows also the replacement work of the cutter etc. to be extremely easily carried out.

After the maintenance of the washing etc. of the cutter part 45, the cylinder unit 65 is operated and extended to bring the connection flange 49 into contact with the connection-receiving seat 31 and fixedly fasten them together with the bolts.

Since the cutter/motor unit 7 moves toward the inside of the device frame 3 between the front-end posts 13, the protruding amount of the cutter/motor unit 7 from the device frame 3 is reduced. This protruding amount may be eliminated.

The cutter/motor unit 7 may be configured to be connected and fixed to the heating kettle 5.

The cutter part 45 of the cutter/motor unit 7 may be configured to have only a circulating function of the stirring substance without a cutting function.

The load cells may be installed into the legs 17. In this case, since the body frame 9 is also on the load cells, it is advantageous to further strengthen a structure for suppressing the vibration, for example, taking fixation for the motor bed 55 from the body frame 9 side.

The invention claimed is:

1. A stirring device comprising:
   a stirring container supported with a device frame;
   a rotary operating part/motor unit, in which a rotary operating part and a motor part are coaxially and integrally formed and linked with each other, attached to a bottom part of the stirring container on a first side around a bottom center of the bottom par in a radial direction of the stirring container at a slant so that a rotational axis is inclined downward toward an outside of the stirring container, the motor part side protruding outside the stirring container and the rotary operating part facing inside the stirring container;
   a first uprising frame attached to the bottom part of the stirring container on a second side around a bottom center of the bottom part in said radial direction, the second side being opposite to the first side across the bottom center in said radial direction;
   a reinforcement base supported with the first uprising frame and extending from the second side to the first side across the bottom center in said radial direction to have a portion facing the motor part of the rotary operating part/motor unit on the first side; and
   a supporting stand being provided to bridge between said portion of the reinforcement base facing the motor part of the rotary operating part/motor unit and the motor part of the rotary operating/motor unit on the first side, thereby to support the rotary operating part/motor unit to the reinforcement base,
   wherein the supporting stand has an actuator attached to the motor part of the rotary operating part/motor unit to support the rotary operating part/motor unit movably between a connected position and a detached position, the connected position in which the rotary operating part of the rotary operating part/motor unit is attached to the bottom part of the stirring container to face inside the stirring container and the detached position in which the rotary operating part of the rotary operating part/motor unit is detached from the bottom part of the stirring container and keeps a downward outward distance away from the device frame, and
   wherein the rotary operating part is a cutter part, comprising a cylindrical body having through-holes and a cutter member rotatable inside the cylindrical body, and is configured to suck a stirring substance inside the stirring container in the cylindrical body from a central portion side of the stirring container, cut and crush the sucked stirring substance, and discharge the substance from the through-holes along a bottom inner face of the stirring container.

2. The stirring device according to claim 1,
   wherein a closed reinforced structure is configured to include the stirring container, the rotary operating part/motor unit, the reinforcement base, and the supporting stand as reinforcing members,
   wherein the reinforcement base is attached to the bottom part of the stirring container by an uprising frame, and
   wherein the closed shape of the reinforced structure comprises three sides in which a first side depends on the stirring container, the rotary operating part/motor unit, and the supporting stand, a second side depends on the reinforcement base, and a third side depends on the uprising frame.

3. The stirring device according to claim 1,
   wherein a closed reinforced structure is configured to include the stirring container, the rotary operating part/ motor unit, the reinforcement base, and the supporting stand as reinforcing members, wherein the stirring container comprises an up-and-down lid that opens and closes an upper part by means of driving of an up-and-down driving unit, and a stirring shaft, in which a stirring operation part on a lower side is arranged within the stirring container and an upper part is connected to and is movable up and down integrally with a side of the up-and-down lid, the stirring shaft being rotationally driven by a driving unit being out of the up-and-down lid, wherein the up-and-down driving unit is supported with the device frame on an upper side and is integrally connected to the reinforcement base on a lower side, and wherein the closed shape of the reinforced structure comprises three sides in which a first side depends on the up-and-down lid and the driving unit along with a heating kettle, the rotary operating part/motor unit, and the supporting stand, a second side depends on an integral connection between the reinforcement base and the up-and-down driving unit, and a third side depends on the up-and-down driving unit.

4. The stirring device according to any one of claims 1 to 3, wherein a weight-measuring instrument is provided to indirectly measure a change in weight of a stirring substance in the stirring container during a rotation operation of the rotary operating part/motor unit, and wherein the weight-measuring instrument is interposed between the device frame and the stirring container and between the device frame and the up-and-down driving unit.

5. A stirring device comprising:

a stirring container supported with a device frame;

a rotary operating part/motor unit, in which a rotary operating part and a motor part are coaxially and integrally formed and linked with each other, attached to a bottom part of the stirring container on a first side around a bottom center of the bottom part in a radial direction of the stirring container at a slant so that a rotational axis is inclined downward toward an outside of the stirring container, the motor part side protruding outside the stirring container and the rotary operating part facing inside the stirring container;

a first uprising frame attached to the bottom part of the stirring container on a second side around a bottom center of the bottom part in said radial direction, the second side being opposite to the first side across the bottom center in said radial direction;

a reinforcement base supported with the first uprising frame and extending from the second side to the first side across the bottom center in said radial direction to have a portion facing the motor part of the rotary operating part/motor unit on the first side; and a supporting stand being provided to bridge between said portion of the reinforcement base facing the motor part of the rotary operating part/motor unit and the motor part of the rotary operating part/motor unit on the first side, thereby to support the rotary operating part/motor unit to the reinforcement base, wherein the supporting stand has an actuator attached to the motor part of the rotary operating part/motor unit to support the rotary operating part/motor unit movably between a connected position and a detached position, the connected position in which the rotary operating part of the rotary operating part/motor unit is attached to the bottom part of the stirring container to face inside the stirring container and the detached position in which the rotary operating part of the rotary operating part/motor unit is detached from the bottom part of the stirring container and keeps a downward outward distance away from the device frame, and wherein the rotary operating part is a cutter part, comprising a cylindrical body having through-holes and a cutter member rotatable inside the cylindrical body, and is configured to suck a stirring substance inside the stirring container in the cylindrical body from a central portion side of the stirring container, cut and crush the sucked stirring substance, and discharge the substance from the through-holes along a bottom inner face of the stirring container.

6. The stirring device according to claim 1, further comprising:

a second uprising frame being attached to the bottom of the stirring container at a position between the first uprising frame and the rotary operating part/motor unit in a circumferential direction of the stirring container and supporting the reinforcement base.

7. The stirring device according to claim 1, further comprising:

second uprising frames being attached to the bottom of the stirring container at positions on respective sides of the rotary operating part/motor unit and between the first uprising frame and the rotary operating part/motor unit in a circumferential direction of the stirring container and supporting the reinforcement base.

* * * * *